United States Patent
Craik et al.

(10) Patent No.: US 11,157,252 B2
(45) Date of Patent: Oct. 26, 2021

(54) ASSESSMENT OF THE BENEFIT OF POST-INLINING PROGRAM TRANSFORMATION IN INLINING DECISIONS

(71) Applicants: INTERNATIONAL BUSINESS MACHINES CORPORATION, Armonk, NY (US); Erick Ochoa, Markham (CA); Jose Nelson Amaral, Markham (CA); Karim Ali, Markham (CA)

(72) Inventors: Andrew James Craik, North York (CA); Erick Ochoa, Edmonton (CA); Jose Nelson Amaral, Edmonton (CA); Karim Ali, Edmonton (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/399,481

(22) Filed: Apr. 30, 2019

(65) Prior Publication Data
US 2020/0348917 A1 Nov. 5, 2020

(51) Int. Cl.
G06F 8/41 (2018.01)

(52) U.S. Cl.
CPC .......... *G06F 8/4443* (2013.01); *G06F 8/4436* (2013.01)

(58) Field of Classification Search
CPC .............................. G06F 8/4443; G06F 8/4436
(Continued)

(56) References Cited

U.S. PATENT DOCUMENTS

| | | | |
|---|---|---|---|
| 6,072,951 A * | 6/2000 | Donovan | G06F 8/4443 717/158 |
| 6,986,130 B1 * | 1/2006 | Boucher | G06F 8/4441 717/150 |

(Continued)

OTHER PUBLICATIONS

Hazelwood etal, "Adaptive Online Context-Sensitive Inlining", 2003, [Online], pp. 1-12, [Retrieved from internet on Jul. 8, 2021], <https://ieeexplore.ieee.org/stamp/stamp.jsp?tp=&arnumber=1191550> (Year: 2003).*

(Continued)

*Primary Examiner* — S. Sough
*Assistant Examiner* — Zengpu Wei
(74) *Attorney, Agent, or Firm* — Kenneth Han

(57) ABSTRACT

A method, computer system, and computer program product for estimation of post-inlining transformation benefits are provided. The embodiment may include performing abstract interpretation on a program to find potential post-inlining transformations. The embodiment may also include encoding potential post-inlining transformations into a profitability metric by associating constraints under which a profit is determined to be realized. The embodiment may further include scaling the profitability metric using the relative execution frequency of the program point to which the transformation applies to favor applying transformations in the most frequently executed code paths. The embodiment may also include generating method summaries to store the potential post-inlining transformations in the method summaries. The embodiment may further include creating a method summary map to match each method with each method summary.

20 Claims, 7 Drawing Sheets

(58) Field of Classification Search
USPC .......................................................... 717/151
See application file for complete search history.

(56) References Cited

U.S. PATENT DOCUMENTS

| | | | | |
|---|---|---|---|---|
| 7,340,732 | B2* | 3/2008 | Gu ........................ | G06F 8/4443 717/140 |
| 9,009,691 | B1* | 4/2015 | Chen ..................... | G06F 8/4443 717/140 |
| 9,378,001 | B2 | 6/2016 | Rahbar et al. | |
| 9,383,980 | B2 | 7/2016 | Inoue et al. | |
| 9,495,141 | B1 | 11/2016 | Craik et al. | |
| 10,055,210 | B2 | 8/2018 | Craik et al. | |
| 2005/0262491 | A1* | 11/2005 | Gu ........................ | G06F 8/4443 717/151 |
| 2011/0179403 | A1* | 7/2011 | Lerouge ................ | G06F 8/4443 717/141 |
| 2014/0245274 | A1* | 8/2014 | Inoue .................... | G06F 8/4443 717/151 |
| 2015/0046912 | A1 | 2/2015 | Vick et al. | |
| 2016/0004518 | A1 | 1/2016 | Sharma et al. | |

OTHER PUBLICATIONS

Grace Period Disclosure, Craik et al., "Guiding Inlining Decisions by Identifying Post-Inlining Transformations", 17th Workshop on Compiler-Driven Performance, CASCON 2018, Oct. 31, 2018, Abstract Only, 2 pages.

Grace Period Disclosure, Ali, "U Can't Inline This", Splash 2018, Nov. 2018, Boston Massachusetts, Abstract Only, 4 pages.

Mell et al., "The NIST Definition of Cloud Computing", Recommendations of the National Institute of Standards and Technology, Sep. 2011, 7 pages.

* cited by examiner

ASSESSMENT OF THE BENEFIT OF POST-INLINING PROGRAM TRANSFORMATION IN INLINING DECISIONS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURES: U Can't Inline This, Karim Ali, Nov. 6, 2018, Pages 1-4; and Guiding Inlining Decisions by Identifying Post-Inlining Transformations, Erick Ochoa, Andrew Craik, Jose Nelson Amaral, Karim Ali, Oct. 31, 2018, Pages 1-2.

BACKGROUND

The present invention relates, generally, to the field of computing, and more particularly to compilation and code transformations.

Compilation of a computer program starts with a straightforward transformation from human-readable program text to machine language by a compiler. After the initial translation, the compiler attempts to improve the program through several code transformations. These code transformations may change the operational properties of the program while maintaining the functional properties of the program. Some transformations are not commutative, and thus, the order in which transformations are applied to programs affects the result of the final transformed program.

SUMMARY

According to one embodiment, a method, computer system, and computer program product for estimation of post-inlining transformation benefits are provided. The embodiment may include performing abstract interpretation on a program to find potential post-inlining transformations. The embodiment may also include encoding potential post-inlining transformations into a profitability metric by associating constraints under which a profit is determined to be realized. The embodiment may further include scaling the profitability metric using the relative execution frequency of the program point to which the transformation applies to favor applying transformations in the most frequently executed code paths. The embodiment may also include generating method summaries to store the potential post-inlining transformations in the method summaries. The embodiment may further include creating a method summary map to match each method with each method summary. The embodiment may also include computing constraints for the values of arguments passed to each callee method at each call site to associate the constraints from each call site with each method summary to determine the potential post-inlining transformations that are effective. The embodiment may further include aggregating the determined effective post-inlining transformations to a profitability metric for the whole procedure.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
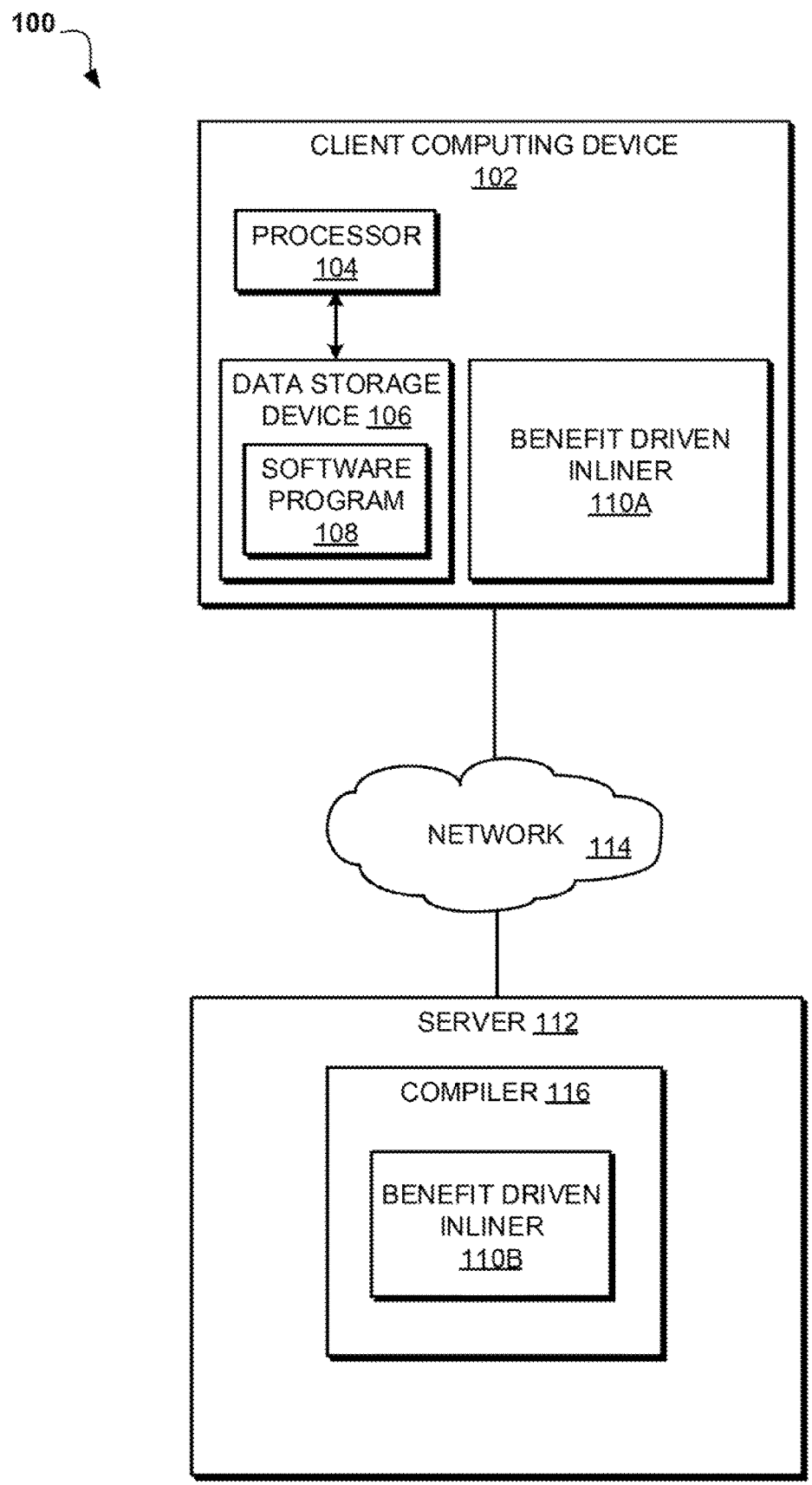
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to code transformations. The following described exemplary embodiments provide a system, method, and program product to detect potential post-inlining transformations using abstract interpretation, generate profitability scores for post-inlining transformations potentially enabled by method inlining and a method summary that holds constraints under which a given transformation may be applicable and an assigned profitability score and to determine the potential post-inlining transformations that are actually effective. Therefore, the present embodiment has the capacity to improve the technical field of compilation and code transformations by ensuring that the compiler selects the most beneficial subset of procedure invocations to undergo method inlining through a deterministic process, because the current state-of-the-art relies on heuristics to guide these selections leading to sub-optimal solutions and non-deterministic behavior.

As previously described, a compiler translates a program from one representation to another. As part of this translation, most compilers attempt to improve the program through code transformations. These code transformations may change the operational properties of the program while maintaining the functional properties of the program. Some transformations are not commutative, and thus, the order in which transformations are applied to programs affects the result of the final transformed program. Inline substitution is a method of code transformations that replaces a procedure invocation with the code of the procedure invoked. While many program analyses and code transformations in a compiler are limited to the scope of a procedure, programs written in an object-oriented language tend to have shorter methods and intra-procedural transformations are likely to be ineffective. Research and practical experience have shown that inline substitution increases the scope for intra-procedural transformations. Inline substitution is especially beneficial when the caller context contains information that constrains the range of values to be considered for one or more method arguments (for example, when one or more arguments are constants) because this information can be exploited by intra-procedural transformations once the inline substitution has been made. Such transformations are called post-inlining transformations.

Since indiscriminate application of inline substitution to programs is far from ideal and often leads to performance reduction, choosing which invocations should undergo inline substitution is a hard problem that has been the subject of much academic study. Current state-of-the-art compilers generally rely on heuristics and approximations to guess when inline substitution will be beneficial. Most of the known techniques related to inlining decisions are based on the size of the procedures to be inlined. Such decisions are also based on the observations that applying inline substitution eliminates the cost of invoking the substituted procedure but that substituting large procedures increases the size of the procedure being compiled. However, the known techniques do not explicitly model how the potential for post-inlining transformations could influence inlining decisions. As such, it may be advantageous to, among other things, implement a system capable of estimating the benefits of post-inlining transformations in the creation of an inline-substitution strategy by computing a method summary and matching constraints at each call site with the constraints required for each post-inlining transformation from the method summary.

According to one embodiment, a benefit-driven inliner implementation may detect potential post-inlining transformations using abstract interpretation and generate profitability scores for method inlining where, for a given embodiment, profitability could be taken to be a single number representing the benefit likely to be provided by the transformations being modeled. In at least one embodiment, the benefit-driven inliner may compute a method summary that lists possible post-inlining transformations and computes constraints on the values of arguments passed to the method that needs to be satisfied to allow the transformation to take place. In at least one other embodiment, the benefit-driven inliner may intersect the constraints on the method summary with the facts known at the call site to determine if the optimization could take place and then use this knowledge to compute the aggregated profitability score for the specific substitution being analyzed. The embodiment may also scale the benefit using relative execution frequency information to objectify transformations in code that is the most likely to be executed frequently.

The present invention may be a system, a method, and/or a computer program product at any possible technical detail level of integration. The computer program product may include the computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The following described exemplary embodiments provide a system, method, and program product for generating estimations of post-inlining transformation benefits.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a benefit-driven inliner 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a benefit-driven inliner 110B, a compiler 116 and communicating with the client computing device 102 via the communication network 114, in accordance with embodiments of the invention. The server computer 112 may provide necessary information to the benefit-driven inliner 110B, such as data related to data block frequency and the bytecode of the methods to be analyzed. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the benefit-driven inliner 110A, 110B may be a program capable of collecting potential post-inlining transformations and optimization opportunities and storing the optimization opportunities in method summaries. The benefit-driven inliner 110A, 110B may also be capable of determining effective post-inlining transformations and aggregating the effective post-inlining transformations to a profitability metric for the whole procedure. The post-inlining transformation benefits estimation process is explained in further detail below with respect to FIG. 2-4.

Figure 2:
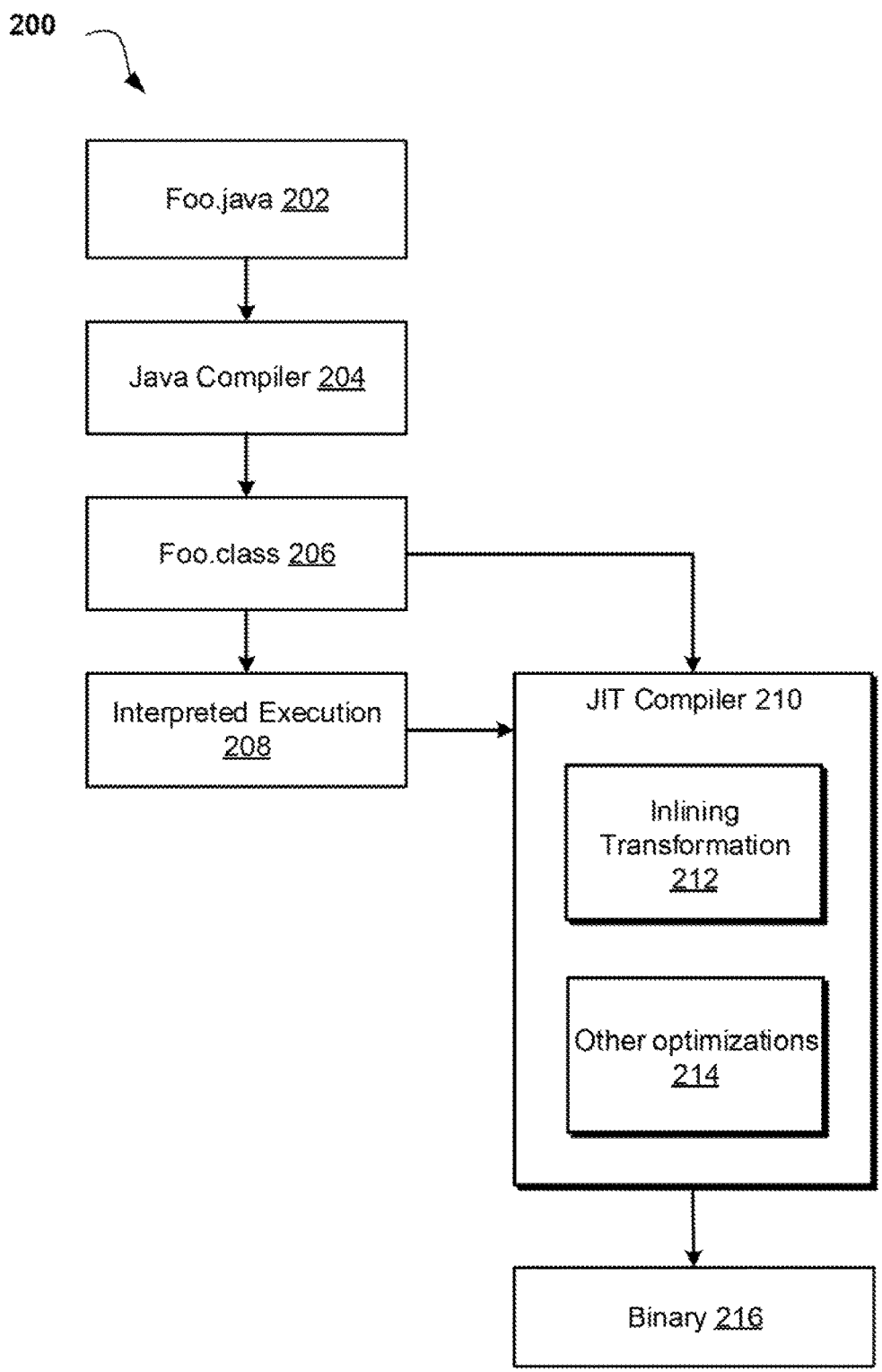
FIG. 2 is a block diagram illustrating a traditional flow of a Java® program as it goes through different compilation stages according to at least one embodiment.

FIG. 2 is a block diagram illustrating a traditional flow of a Java® (Java and all Java-related trademarks and logos are trademarks or registered trademarks of Oracle America, Inc. and/or its affiliates) program as it goes through different compilation stages in the post-inlining transformation benefits estimation process 200 according to at least one embodiment. Java® Compiler 204 may compile a Java® source file 202 into a class file 206. A Java® Virtual Machine (JVM) may then interpret the class file 206. A Java® Virtual Machine equipped with a Just-In-Time (JIT) compiler may perform an inline transformation 212 as one of its optimization processes. The JIT compiler 210 may then proceed to perform other optimizations 214 and generate a transformed and optimized binary 216.

Figure 3:
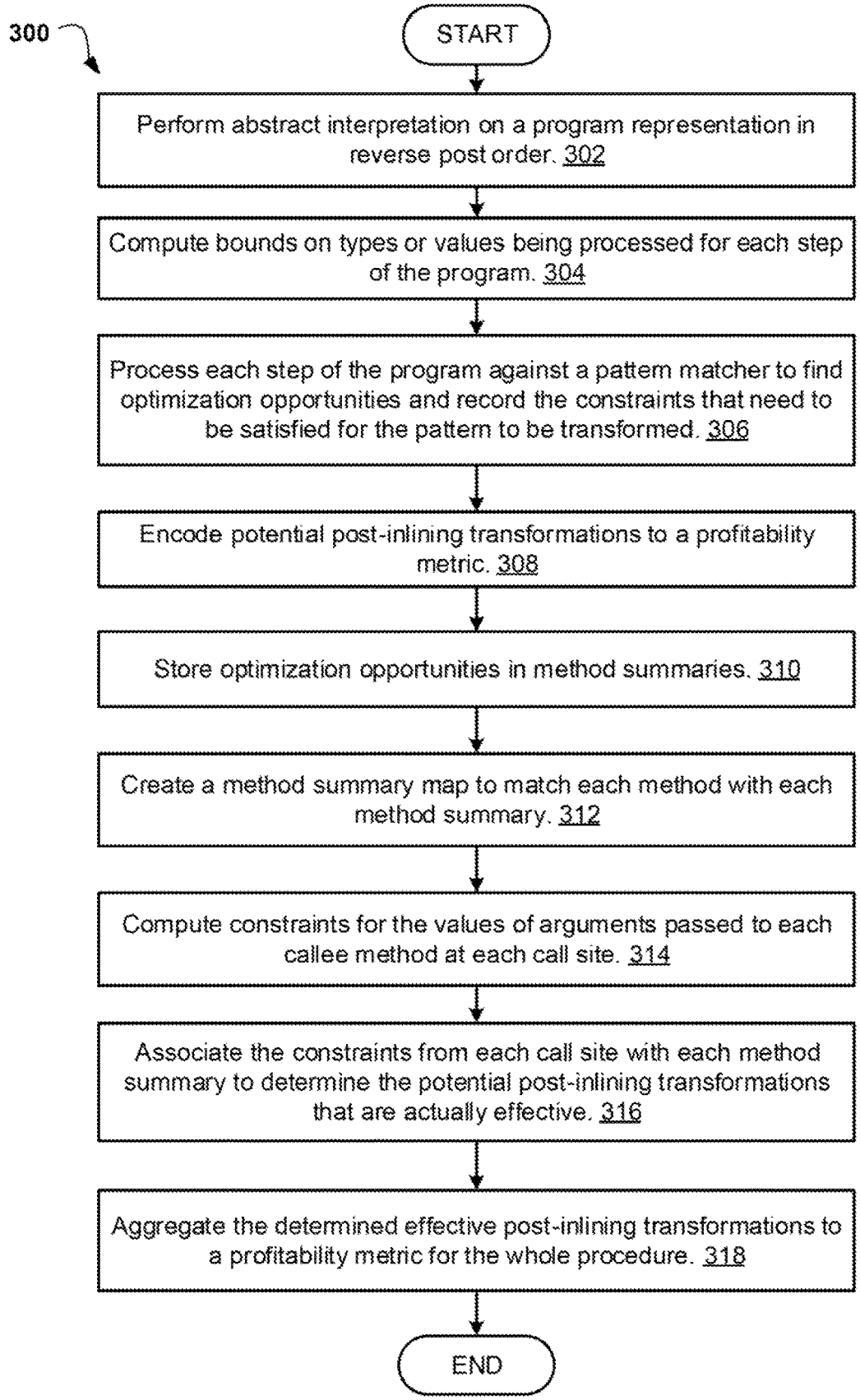
FIG. 3 is an operational flowchart illustrating a post-inlining transformations benefit estimation process according to at least one embodiment.

Referring now to FIG. 3, an operational flowchart illustrating a post-inlining transformations benefits estimation process 300 according to at least one embodiment is depicted. At 302, the benefit-driven inliner 110A, 110B performs abstract interpretation of a program representation in reverse post order. When traversing a program representation, abstract interpretation may follow the order of execution of statements in the program starting at the first statement of the program and following the direction of the edges in the contro-flow-graph representation of the program. Abstract interpretation my also follow a reverse post order where it starts by processing the last statement in the program and follows the edges of the control-flow-graph of the program backwards until it reaches the first statement of the program. According to one embodiment, the benefit-driven inliner 110A, 110B may process every method before any of the candidate method calls it contains are processed. When a method is processed, the instructions in the method may be processed using an abstract interpreter which computes symbolic representations for program values and looks for instruction sequences amenable to program optimization. When an opportunity for optimization is found, the benefit-driven inliner 110A, 110B may record the opportunity and any dependencies found on the method's input parameters.

Next at 304, the benefit-driven inliner 110A, 110B computes bounds on types or values being processed for each step of the program. According to one embodiment, the benefit-driven inliner 110A, 110B may model a branch elimination optimization to determine that a known constraint on the value of an argument may lead to great simplification of codes after inlining. Example 1 below shows a Java® function and a corresponding Java® bytecode to demonstrate how indirect benefits of inlining based on argument constraints are estimated by propagating these constraints to statements in a procedure and then determining that certain code transformations are enabled in the presence of such constraints.

Example 1: Source Code

```
public static Boolean foo (int length) {
    if (length < 0) {
        return true;
    }
    else {
        / * arbitrary code */
        return false;
    }
}
public static void bar (String str) {
    if (!foo (str.length)) {
        errorHandling ( ) ;
    }
    / * arbitrary code */
}
```

Example 2: Byte Code

```
public static boolean foo (int)
    ;
0:       iload_0
1:       ifge    6
4:       iconst_1
5:       iretrun
6:       // ...
15:      iconst_0
16:      ireturn
public static void bar (java. Lang. String) ;
0:       aload_0
```

```
1:       invokevirtual #3 // Method
             Java/lang/String.length: ( )I
4:       invokestatic #4 // Method
             Foo: (I)Z
7:       ifeq    13
10:      invokestatic #5 // Method
             errorHandling: ( )V
13:      // ...
```

In the above example, a Java® bytecode may be executed by a JVM In order to perform a profitability analysis utilizing a Java® bytecode language, the flow functions need to be defined to consider its semantics. For instance, the JVM may keep an operand stack used for temporary storage of operands used by bytecode operations. Each operand stack may be organized into frames, one frame for each method execution. Each frame may contain a variable array that stores method arguments and local temporary values. In the above example of the bytecode, iload_0 loads the integer at the 0-th position from the current frame's variable array and places it on the operand sack. According to at least one embodiment, an abstract interpreter may be capable of emulating the functionality of the variable array, being able to store and retrieve constraints (i.e. value intervals/bounds) instead of specific values, providing an abstract representation of the program's internal state without reference to specific inputs.

At 306, the benefit-driven inliner 110A, 110B processes each step of the program against a pattern matcher to find optimization opportunities and record the constraints that need to be satisfied for the pattern to be transformed. In the above example, the abstract interpreter may find that there is a conditional branch and that if the length is always positive, the abstract interpreter will jump to bytecode 6 or if the length is non-positive, then the abstract interpreter will always fall through to bytecode 4. In the same example, the benefit-driven inliner 110A, 110B may start running an abstract interpreter to gather facts about method foo/bar and attempt to determine which methods should be inlined. When the abstract interpreter reaches bytecode 4, the benefit-driven inliner 110A, 110B may analyze and determine whether there is an existing method summary for the methods. If there is no previously recorded method summary for the methods, then the benefit-driven inliner 110A, 110B may create another instance of the abstract interpreter, running it over the bytecode of "foo" to produce a method summary table. Once the summary table is produced, the benefit-driven inliner 110A, 110B may consider each row in the table in the context of the call to "foo" in bar that the benefit-driven inliner 110A, 110B were initially considering. By intersecting the constraints for the arguments to "foo" with the entries in the method summary table, for example, the benefit-driven inliner 110A, 110B may determine that the length is non-negative and conclude that row 2 of the table 1 below would apply and could add the benefit of that row to the benefit of inlining the method.

At 308, the benefit-driven inliner 110A, 110B encodes the potential post-inlining transformations to a profitability metric. According to one embodiment, the benefit-driven inliner 110A, 110B may automatically compute the profitability of specific post-inlining transformations. A simple profitability metric for a branch elimination may be generated by determining the number of instructions that are eliminated after the branch has been eliminated. In at least one other embodiment, the benefit-driven inliner 110A, 110B may divide the eliminated instructions into two categories: dynamic instructions and static instructions. The benefit-driven inliner 110A, 110B may determine a dynamic instruction by finding an instruction that would be executed prior to the inlining transformation but is no longer executed after inlining. The benefit-driven inliner 110A, 110B may determine a static instruction by finding an instruction that would not have been executed regardless of inlining. In at least one other embodiment, the benefit-driven inliner 110A, 110B may scale the profitability metric using the relative execution frequency of the transformation point to objectify transformations in the most frequently executed code paths In the above example, the only dynamic instruction that is eliminated is the "ifge" instruction. The static instructions that are eliminated may depend on the path taken during execution. According to one embodiment, a sufficiently capable abstract interpreter may determine the number of dynamic and static instructions that were eliminated and may assign weights to compute a profitability metric. A simple profitability metric may use the cache line size to weigh the benefit of eliminating static instructions and the equation is as follows:

Profitability=Eliminated dynamic instructions+Eliminated static instructions/Cache line size The above profitability metric may only focus on the benefits of the improved instruction cache locality. According to one embodiment, the benefit-driven inliner 110A, 110B may encode procedures to map potential post-inlining transformations into an inlining profitability metric. In the above example, if the argument length is negative, all instructions in the code block corresponding to the else statement are static instructions that are removed after the branch elimination. The "ifge" instruction is the only dynamic instruction that is removed in this case and thus, the profitability according to the above equation is 1+10/64. If the argument length is zero or positive, the code block corresponding to the if statement and the instruction "ifge" may be removed altogether, and thus, the profitability would be 1+2/64. According to at least one other embodiment, the benefit-driven inliner 110A, 110B may simplify the above-described calculation of profitability by changing the above equation to the following:

Profitability=Eliminated dynamic instructions+Eliminated static instructions/Cache line size At 310, the benefit-driven inliner 110A, 110B stores optimization opportunities in method summaries. According to one embodiment, the benefit-driven inliner 110A, 110B may create a method summary to hold information about potential optimization. According to one other embodiment, the benefit-driven inliner 110A, 110B may create a method summary table with five columns. Each column may represent "Potential Transformation", "Bytecode Offset", "Benefit", "Argument" and "Return Constraint". Table 1 below is an example of a method summary for the code example discussed in step 308.

TABLE 1

<Example of a Method Summary>

| Potential Transformation | Bytecode Offset | Benefit | Argument 1 | Return Constraint |
|---|---|---|---|---|
| Branch elimination (arg1 < 0) | 2 | 1 + 2/64 | [MIN_INT, −1] | True |
| Branch elimination (arg1 ≥ 0) | 2 | 1 + 10/64 | [0, MAX_INT] | False |

Each row in a method summary may correspond to a potential code transformation found by an abstract interpreter. As an aid to human understanding and debugging, the first column may denote the type of code transformation that could take place. The second column, also as an aid to human understanding and debugging, may show the bytecode offset from the start of a method and may be utilized to map the opportunity back to the code. The third column may represent the value of the benefit metric assigned to each transformation. This may be added to the method's benefit score if the call site constraints prove the transformation has the potential to occur. The remaining columns may denote the corresponding arguments and the return constraints. In the example provided in the above paragraph, the constraints placed on the return values of function "foo" may be used to predict that a branch is always directed to be taken in function "bar". The benefit-driven inliner 110A, 110B may program the abstract interpreter to modify the profitability metric assigned to method "foo" while interpreting the parent node "bar". Taking into account the return constraints while performing the abstract interpretation of "bar" may allow the abstract interpreter to safely determine that a branch will always be taken in the method "bar". According to one other embodiment, a method summary may contain constraints on the return values independent from the values of the arguments. For example, for a programming language that uses factory methods whose sole purpose is to return an object, the class of the return values as specified in the method signature may be an interface and method may not take any arguments, and thus, the benefit-driven inliner 110A, 110B may make a design decision whether or not to state the return constraints in a manner independent of the arguments in a case where it would be unreasonable to have a method summary when arguments are matched to the return constraint of the method. In another embodiment, the benefit-driven inliner 110A, 110B may create result constraints dependent on the arguments and determine which applies in the context of the call site and could potentially find additional benefits in bar in the above example.

It would be advantageous to create and utilize method summaries since, without method summaries, the abstract interpreter would need to re-analyze methods to calculate the same potential transformations and associated constraints, leading to an increase in compilation time. With the utilization of method summaries, all the constraints are re-used for the methods at each of their respective call sites. According to at least one other embodiment, method summaries may have extra columns to represent constraints on heap or shared mutable state. For example, with respect to non-functional programming languages, it may be possible that some optimizations depend on the program state. In this case, encoding the program state (i.e. the heap or shared mutable state) into the method summary may yield a higher benefit number for non-functional programming languages.

At 312, the benefit-driven inliner 110A, 110B creates an entry in a method summary map to match each method with each method summary. The method summary map may be per compilation and empty by default. According to one embodiment, the benefit-driven inliner 110A, 110B may create a method summary map to match method signatures or uniquely identifying features of a method with its corresponding method summary. According to one other embodiment, a method summary map may be lazily generated during run time. The benefit-driven inliner 110A, 110B may not need to pre-compute a method summary map before run time and may only need to insert entries in a method summary map as needed. Further, if a method summary map is consuming too much memory, items in the method summary map may be deleted. The benefit-driven inliner 110A, 110B may update a method summary map if a new and more precise analysis is run on the same method. In at least other embodiments, the benefit-driven inliner 110A, 110B may choose to reuse method summary maps in whole or in part in subsequent compilations with appropriate safety checks. Such reuse would reduce the amount of analysis required during inlining, but the savings are counterbalanced by the cost and complexity of the safety checks required to ensure reuse is appropriate. These costs are implementation specific.

At 314, the benefit-driven inliner 110A, 110B computes constraints for the values of arguments passed to each callee method at each call site. According to one embodiment, the benefit-driven inliner 110A, 110B may analyze and determine the indirect benefits of inlining by statically calculating constraints on the values that each argument of a function may have at runtime for each specific call site. the benefit-driven inliner 110A, 110B may propagate argument constraints through the body of the callee to determine if any of a list of possible optimizations could be applied after inlining based on the constraints. The cost of the analysis may be directly proportional to the precision of the constraints and the complexity of the post-inlining transformation patterns being considered. It may be possible that several passes of the analysis may be built with different costs with repeated analysis using even more implementations. Such successive refinement may be possible as the result of the analysis may not be critical for program correctness and a false-positive or a false-negative in the above example only may result in performance degradation. The benefit-driven inliner 110A, 110B may interpret only a subset of statements in a program and ignore the others. Further, the benefit-driven inliner 110A, 110B may determine beneficial code transformations that would be possible after inlining based on known constraints on the value that the arguments of a method may assume at runtime. For example, the benefit-driven inliner 110A, 110B may propagate the value of a constant through the body of a callee to determine several optimizations that would simplify the code significantly without taking into consideration the full range of the argument values. However, focusing only on constant arguments may limit the optimization opportunities that could be discovered. In at least one other embodiment, the benefit-driven inliner 110A, 110B may represent the constraints on the value of each argument as an interval of the form [min, max] for scalar numerical values. In other embodiments, the benefit-driven inliner 110A, 110B may represent constraints on the type of a value using a type constraint that holds the most abstract type a given value may have.

At 316, the benefit-driven inliner 110A, 110B associates the constraints from each call site with each method summary to determine the potential post-inlining transformations that are actually effective. According to one embodiment, once the constraints at the call site are computed, it may be possible to associate them with the constraints of the method summary. In the example shown in Table 1, each row may correspond to one optimization opportunity and contain at least one constraint that is related to a specific argument. According to one other embodiment, the benefit-driven inliner 110A, 110B may determine a code transformation opportunity after inlining if the argument constraints found at the call site satisfy the constraints specified by the transformation in a given row of the method summary table.

At 318, the benefit-driven inliner 110A, 110B aggregates effective post-inlining transformations to a profitability metric for the whole procedure. Once the constraints from the method summary are associated with the argument constraints computed at the call site, and the constraints at the call site satisfy all the required constraints of the method summary for that given argument, a potential post-inlining transformation may be realizable after inlining. According to one embodiment, the benefit-driven inliner 110A, 110B may add the profitability metric for realizable post-inlining transformations and aggregate all the profitability metrics from all such transformations. The benefit-driven inliner 110A, 110B then may add the final value to an Inlining Dependence Tree (IDT)—a data structure which captures the inlining opportunities in a tree data structure with parent-child relationships representing dependencies (e.g. that a caller must be inlined before inlining one of its callees). The IDT is saved to be used by the benefit-driven inliner to pick the optimal inlining solution. In at least one embodiment, the Inlining Dependence Tree is a state space searched by an algorithm which solves the knapsack packing problem with dependencies—the algorithm computes an optimal solution by traversing all the possible inlining states.

Figure 4:
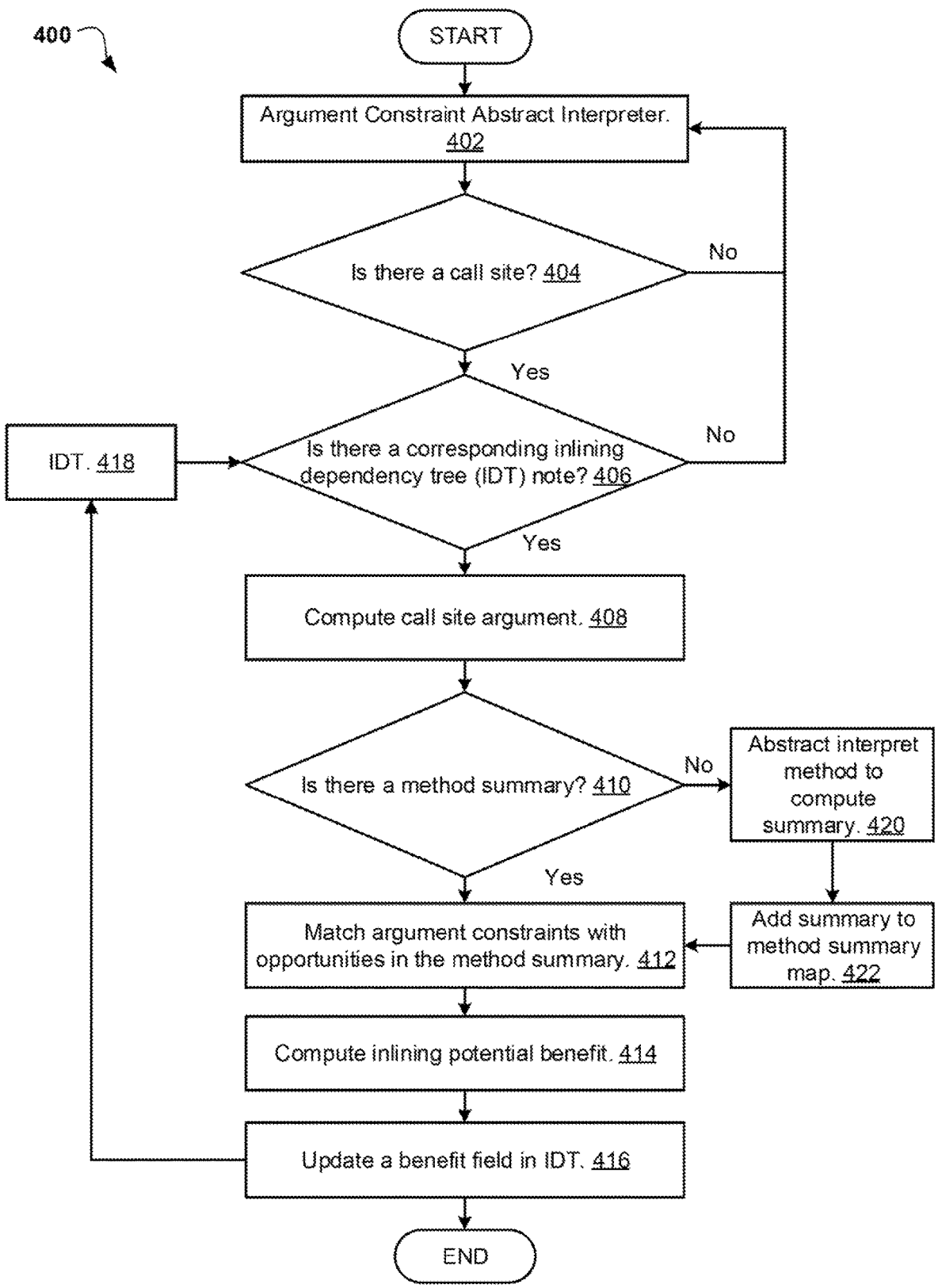
FIG. 4 is an operation flowchart illustrating an overview of a profitability analysis according to at least one embodiment.

Referring now to FIG. 4, an operation flowchart illustrating an overview of a profitability analysis according to at least one embodiment is depicted. At 402, an abstract interpreter starts at the root procedure to compute argument constraints. At 404, the benefit-driven inliner 110A, 110B determine if there is a call site. If there is a call site (step 404, "Yes" branch), then the benefit-driven inliner 110A, 110B may continue to 406 to further determine whether there is a corresponding IDT node (i.e. if the call site is a candidate for inlining). If the benefit-driven inliner 110A, 110B does not find an entry for the call site (step 404, "No" branch), then the benefit-driven inliner 110A, 110B may return to step 402.

At 406, the benefit-driven inliner 110A, 110B may determine whether there is a corresponding IDT node. If the benefit-driven inliner 110A, 110B determine that there is a corresponding IDT node (step 406, "Yes" branch), then the benefit-driven inliner 110A, 110B may continue to step 408 to compute call site argument. If the benefit-driven inliner 110A, 110B determines that there is no corresponding IDT node, then the benefit-driven inliner 110A, 110B may return to step 402.

At 408, the benefit-driven inliner 110A, 110B computes call site argument based on the current abstract state. At 410, the benefit-driven inliner 110A, 110B determines whether there is a method summary for the method being invoked. If the benefit-driven inliner 110A, 110B determines that such a summary exists (step 410, "Yes" branch), then the benefit-driven inliner 110A, 110B may continue to 412 to match argument constraints with opportunities in the method summary. If the benefit-driven inliner 110A, 110B determines that a method summary does not yet exist (step 410, "No" branch), then the benefit-driven inliner 110A, 110B may continue to step 420 to abstractly interpret the method and add a new summary to a method summary map at step 422. At 412, the benefit-driven inliner 110A, 110B may match the argument constraints with the code transformation opportunism in the method summary. Then, a potential benefit for the inline substitution at the call site may be computed at 414 and the benefit filed in IDT may be updated at 416. The updated IDT may interact with the benefit-driven inliner 110A, 110B to determine if there is a corresponding IDT node in step 406.

It may be appreciated that FIGS. 2-4 provide only an illustration of one implementation and do not imply any limitations with regard to how different embodiments may be implemented. Many modifications to the depicted environments may be made based on design and implementation requirements. For example, in at least one embodiment, the benefit-driven inliner 110A, 110B may iterate over any other abstract program representation and not just the IDT. The benefit-driven inliner 110A, 110B may be applicable when using static call graphs or dynamic call graphs. The benefit-driven inliner 110A, 110B may also be used to make inline substitution decisions in any procedural programming languages. the benefit-driven inliner 110A, 110B may further be used in interpreters that operate on multiple programming languages.

Figure 5:
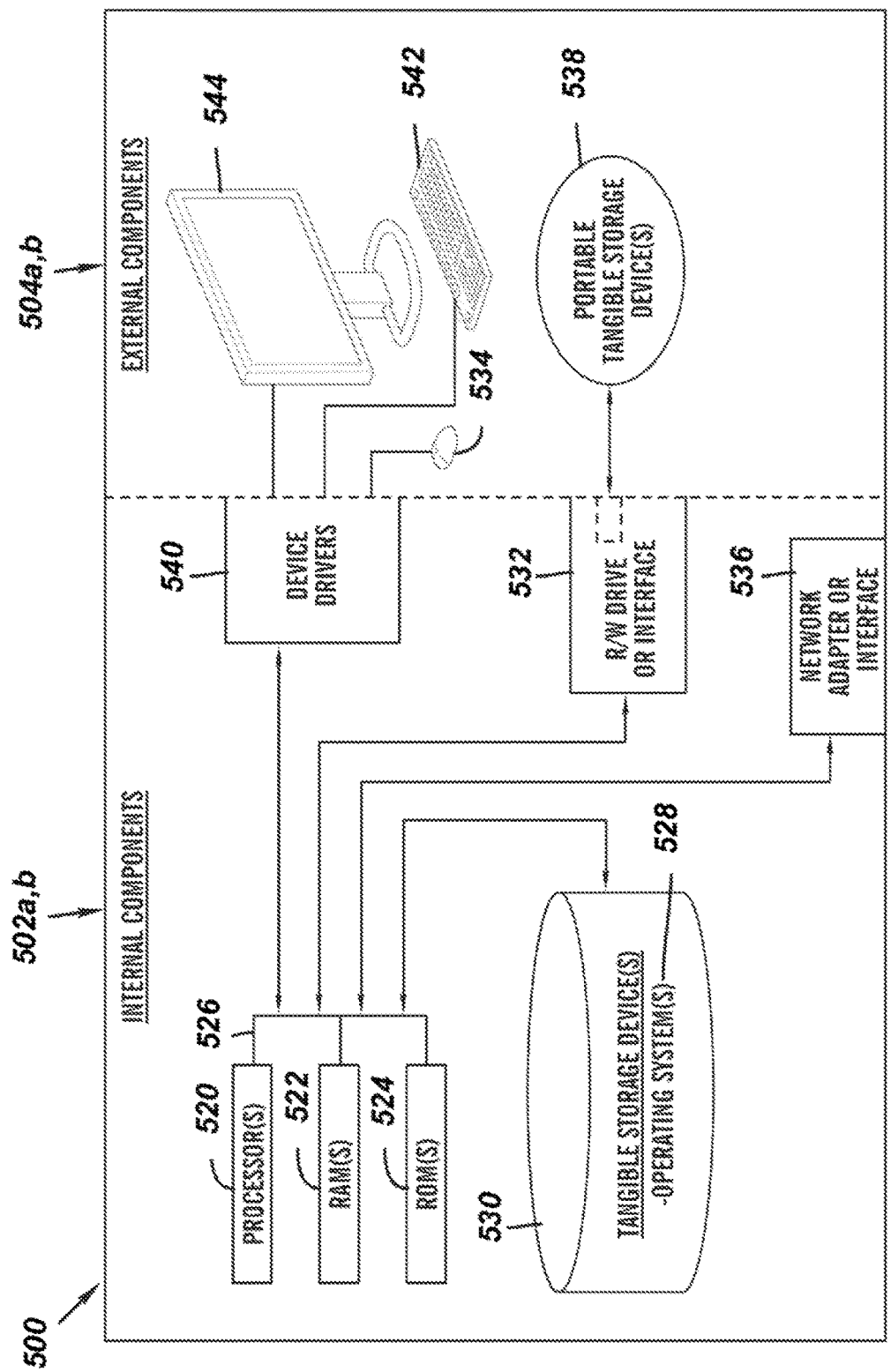
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the benefit-driven inliner 110A in the client computing device 102 and the benefit-driven inliner 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes an R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the benefit-driven inliner 110A, 110B can be stored on one or more of the respective portable computer-readable tangible storage devices 538, read via the respective R/W drive or interface 532 and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the benefit-driven inliner 110A in the client computing device 102 and the benefit-driven inliner 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the benefit-driven inliner 110A in the client computing device 102 and the benefit-driven inliner 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
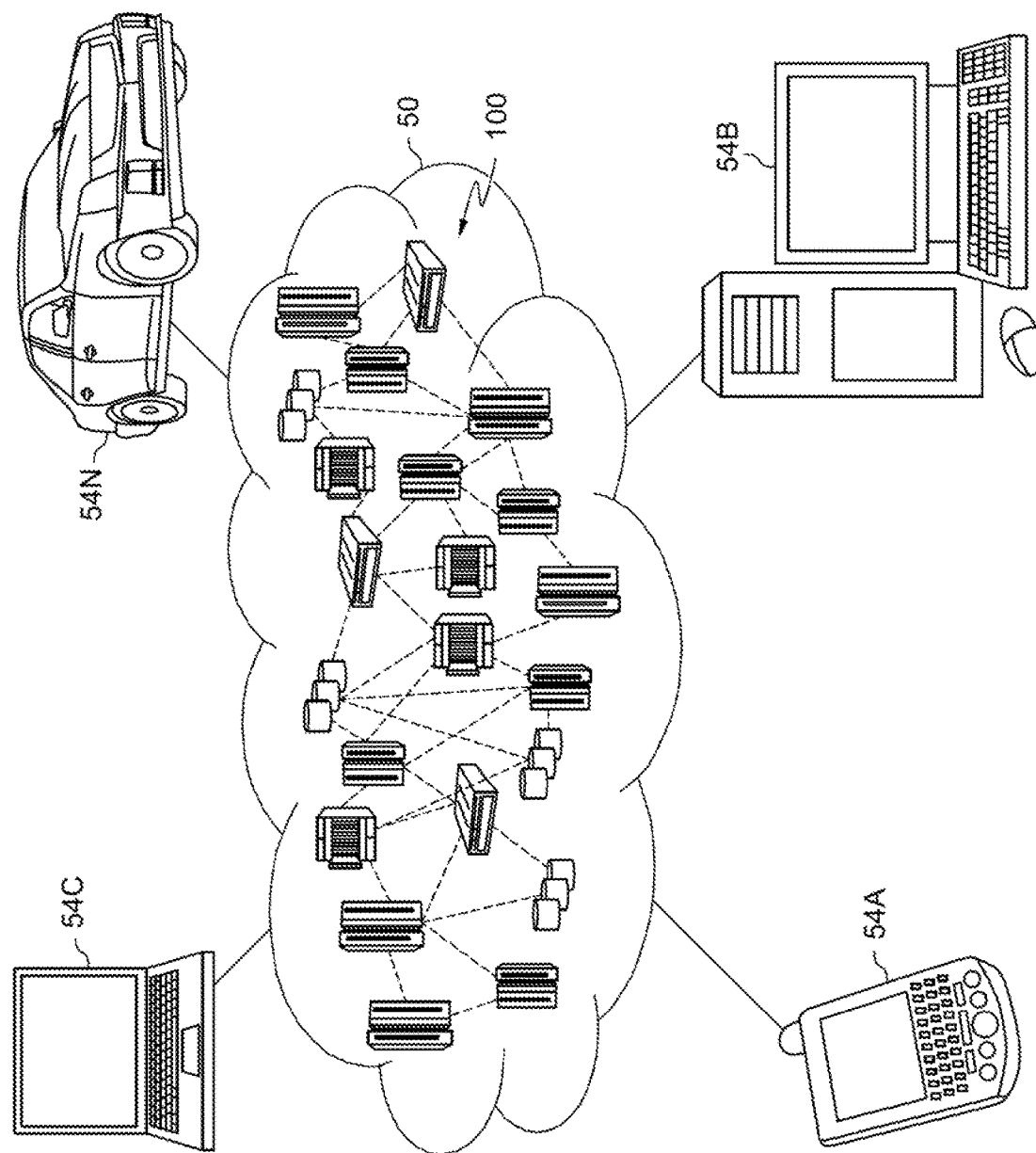
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
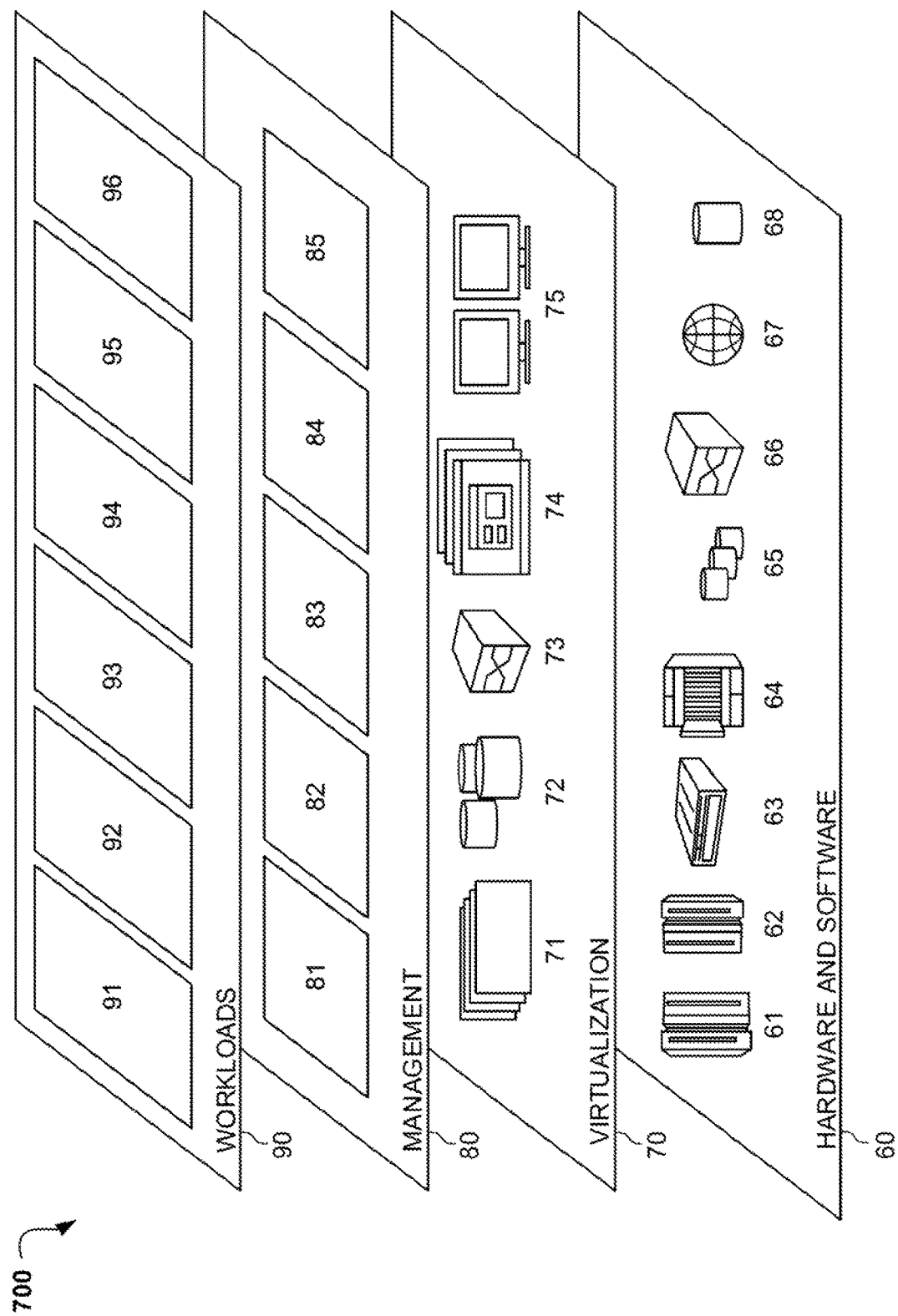
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and post-inlining transformation benefits estimation 96. Post-inlining transformation benefits estimation 96 may relate to computing constraints on the value of arguments passed to the method and matching the argument constraint at each call with the constraints required for each post-inlining transformation from a method summary.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for estimation of post-inlining transformation benefits, the method comprising:
   performing abstract interpretation on a program representation to find potential post-inlining transformations;
   encoding the potential post-inlining transformations into a profitability metric by associating constraints under which a profit is determined to be realized, wherein a profitability of one of the potential post-inlining transformations is automatically calculated and a profitability score is generated for the calculated profitability of the post-inlining transformation using a single number representing a benefit likely to be provided by the potential post-inlining transformation wherein the profitability metric uses a cache line size to weigh a benefit of eliminating static instructions and the profitability metric is computed by adding eliminated dynamic instructions to the eliminated static instructions divided by the cache line size;
   scaling the profitability metric using a relative execution frequency of a program point to which the transformation applies to favor applying transformations in most frequently executed code paths;
   generating method summaries to store the potential post-inlining transformations in the method summaries, wherein the method summaries include a method summary table with five columns, wherein each column of the method summary table represents potential transformation, bytecode offset, benefit, argument and return constraint;
   creating a method summary map to match each method with each method summary, wherein the method summary map is reused in whole or in part in subsequent compilations with an appropriate safety check to reduce an amount of analysis required during inlining;
   computing constraints for values of arguments passed to each callee method at each call site to associate the computed constraints from each call site with each method summary to determine the potential post-inlining transformations that are effective; and
   aggregating the determined effective post-inlining transformations to the profitability metric for whole procedures.

2. The method of claim 1, further comprising:
   computing bounds on types or values being processed for each step of a program.

3. The method of claim 1, further comprising:
   processing each step of a program against a pattern matcher to find optimization opportunities and to record constraints that need to be satisfied for a pattern to be transformed.

4. The method of claim 1, further comprising:
   receiving a code segment; and
   analyzing the code segment from a root procedure to determine whether a call site is encountered; and
   determining whether the call site is potentially eligible for inlining.

5. The method of claim 1, wherein the abstract interpretation is performed in reverse post order.

6. The method of claim 1, wherein the effective post-inlining transformations to a profitability metric for the whole procedures is aggregated with additional scaling to represent relative execution frequencies.

7. The method of claim 1, further comprising:
   computing a potential benefit for an inline substitution at the call site; and
   updating a benefit field in a corresponding Inlining Dependence Tree (IDT) node.

8. A computer system for estimation of post-inlining transformation benefits, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   performing abstract interpretation on a program representation to find potential post-inlining transformations;
   encoding the potential post-inlining transformations into a profitability metric by associating constraints under which a profit is determined to be realized, wherein a profitability of one of the potential post-inlining transformations is automatically calculated and a profitability score is generated for the calculated profitability of the post-inlining transformation using a single number representing a benefit likely to be provided by the potential post-inlining transformation wherein the profitability metric uses a cache line size to weigh a benefit of eliminating static instructions and the profitability metric is computed by adding eliminated dynamic instructions to the eliminated static instructions divided by the cache line size;
   scaling the profitability metric using a relative execution frequency of a program point to which the transformation applies to favor applying transformations in most frequently executed code paths;
   generating method summaries to store the potential post-inlining transformations in the method summaries, wherein the method summaries include a method summary table with five columns, wherein each column of the method summary table represents potential transformation, bytecode offset, benefit, argument and return constraint;
   creating a method summary map to match each method with each method summary, wherein the method summary map is reused in whole or in part in subsequent compilations with an appropriate safety check to reduce an amount of analysis required during inlining;
   computing constraints for values of arguments passed to each callee method at each call site to associate the computed constraints from each call site with each method summary to determine the potential post-inlining transformations that are effective; and aggregating the determined effective post-inlining transformations to the profitability metric for whole procedures.

9. The computer system of claim 8, wherein the method further comprising:

computing bounds on types or values being processed for each step of a program.

10. The computer system of claim 8, wherein the method further comprising:

processing each step of a program against a pattern matcher to find optimization opportunities and to record constraints that need to be satisfied for a pattern to be transformed.

11. The computer system of claim 8, wherein the method further comprising:

receiving a code segment; and analyzing the code segment from a root procedure to determine whether a call site is encountered; and determining whether the call site is potentially eligible for inlining.

12. The computer system of claim 8, wherein the abstract interpretation is performed in reverse post order.

13. The computer system of claim 8, wherein the effective post-inlining transformations to a profitability metric for the whole procedures is aggregated with additional scaling to represent relative execution frequencies.

14. The computer system of claim 8, wherein the method further comprising:

computing a potential benefit for an inline substitution at the call site; and updating a benefit field in a corresponding Inlining Dependence Tree (IDT) node.

15. A computer program product for estimation of post-inlining transformation benefits, the computer program product comprising:

one or more computer-readable tangible storage media and program instructions stored on at least one of the one or more tangible storage media, the program instructions executable by a processor of a computer to perform a method, the method comprising:

performing abstract interpretation on a program representation to find potential post-inlining transformations;

encoding the potential post-inlining transformations into a profitability metric by associating constraints under which a profit is determined to be realized, wherein a profitability of one of the potential post-inlining transformations is automatically calculated and a profitability score is generated for the calculated profitability of the post-inlining transformation using a single number representing a benefit likely to be provided by the potential post-inlining transformation wherein the profitability metric uses a cache line size to weigh a benefit of eliminating static instructions and the profitability metric is computed by adding eliminated dynamic instructions to the eliminated static instructions divided by the cache line size;

scaling the profitability metric using a relative execution frequency of a program point to which the transformation applies to favor applying transformations in most frequently executed code paths;

generating method summaries to store the potential post-inlining transformations in the method summaries, wherein the method summaries include a method summary table with five columns, wherein each column of the method summary table represents potential transformation, bytecode offset, benefit, argument and return constraint;

creating a method summary map to match each method with each method summary, wherein the method summary map is reused in whole or in part in subsequent compilations with an appropriate safety check to reduce an amount of analysis required during inlining;

computing constraints for values of arguments passed to each callee method at each call site to associate the computed constraints from each call site with each method summary to determine the potential post-inlining transformations that are effective; and aggregating the determined effective post-inlining transformations to the profitability metric for whole procedures.

16. The computer program product of claim 15, wherein the method further comprising:

computing bounds on types or values being processed for each step of a program.

17. The computer program product of claim 15, wherein the method further comprising:

processing each step of a program against a pattern matcher to find optimization opportunities and to record constraints that need to be satisfied for a pattern to be transformed.

18. The computer program product of claim 15, wherein the method further comprising:

receiving a code segment; and analyzing the code segment from a root procedure to determine whether a call site is encountered; and determining whether the call site is potentially eligible for inlining.

19. The computer program product of claim 15, wherein the abstract interpretation is performed in reverse post order.

20. The computer program product of claim 15, wherein the effective post-inlining transformations to a profitability metric for the whole procedures is aggregated with additional scaling to represent relative execution frequencies.

* * * * *